Aug. 31, 1926.  
E. T. FERNGREN  
1,598,073  
SHEET GLASS DRAWING APPARATUS  
Filed Oct. 11, 1924 3 Sheets-Sheet 1

INVENTOR.
Enoch T. Ferngren.
ATTORNEY.

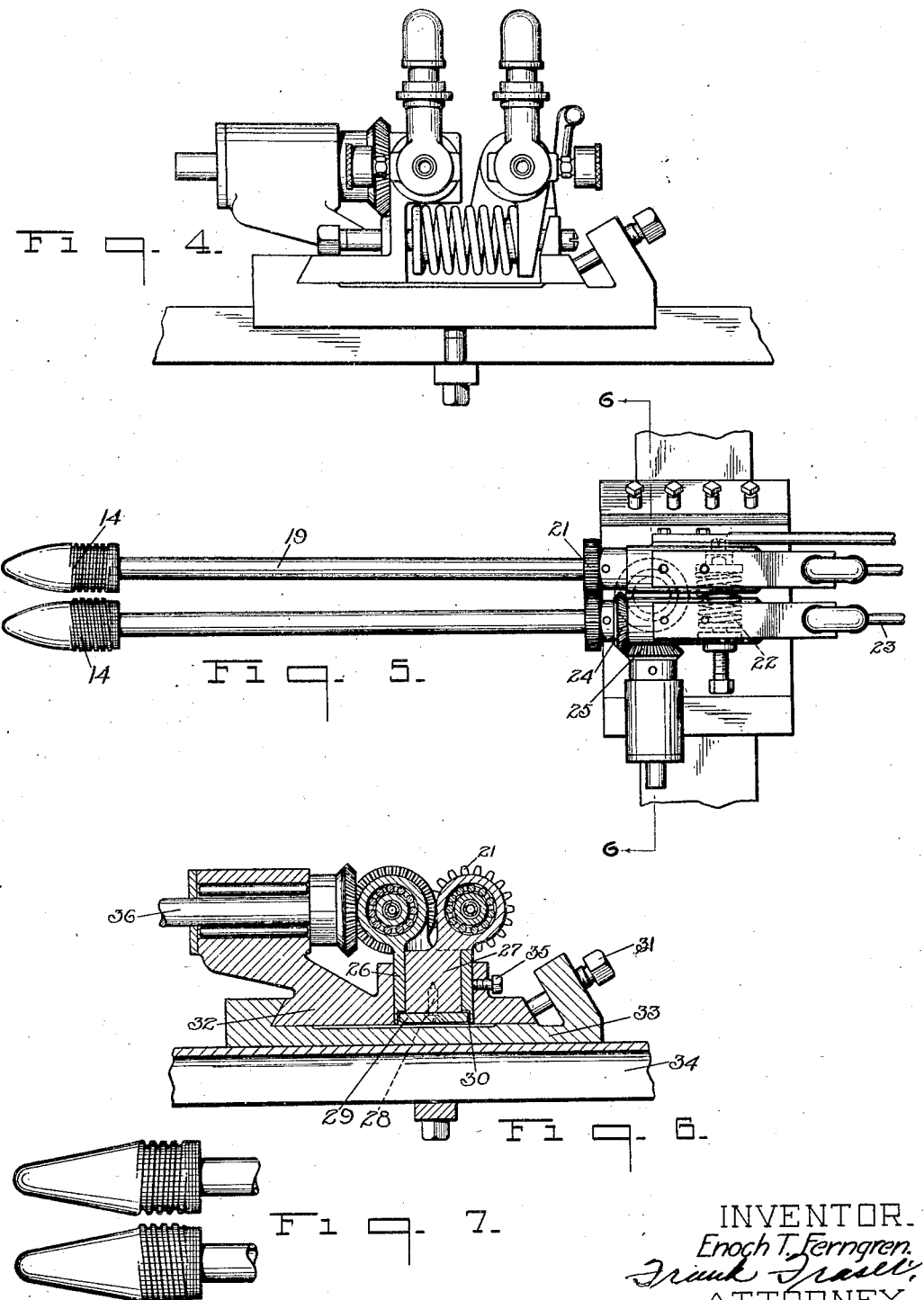

Aug. 31, 1926.

E. T. FERNGREN 1,598,073

SHEET GLASS DRAWING APPARATUS

Filed Oct. 11, 1924     3 Sheets-Sheet 3

INVENTOR.
Enoch T. Ferngren
Frank Fraser,
ATTORNEY.

Patented Aug. 31, 1926.

1,598,073

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

SHEET-GLASS-DRAWING APPARATUS.

Application filed October 11, 1924. Serial No. 742,895.

This invention is an improvement in the art of drawing sheet glass, and relates more particularly to a method and apparatus for maintaining the width of the sheet and to means for making it possible to produce a wider sheet.

While this invention is not limited to use with any one system of producing sheet glass, it is illustrated in connection with an apparatus of the general type set forth in the patent to Colburn, 1,248,809, granted Dec. 4, 1917. In this system a continuous sheet of glass is drawn upwardly from a bath of molten glass and then while still in a semi-plastic condition, although substantially set in its final sheet form, is bent into a horizontal plane and carried off through a suitable drawing mechanism and into a leer. As is well-known in the art, some means must be provided to maintain the width of the sheet drawn, otherwise it will gradually narrow away until no sheet is left. The prior art structures make use of so-called knurled rollers which are usually positioned in the meniscus at its opposite ends, by which the sheet is prevented from narrowing according to its normal tendency. These knurled rollers have however made it necessary to cut off a substantial width of sheet section from the finished sheet due to the fact that the combined action of the rollers and the supplemental air cooling normally employed, causes a thickened portion to extend inward on the sheet a substantial distance from the edge so that it is necessary to remove this thickened portion before obtaining net width of the desired thickness of sheet.

An important object of this invention is to provide an improved type of roller for use in connection with sheet glass drawing apparatus which is adapted to maintain the width of the sheet desired, while at the same time it will cut down to a considerable extent the amount of glass that has heretofore been removed, as above pointed out.

Still another object of the invention is to provide a glass contacting roller of this nature that will produce or make it possible to produce a somewhat flatter and smoother sheet than has heretofore been done.

Another object of the invention is to provide rollers of such shape that they will partly restrict the amount of glass permitted to enter into the sheet immediately adjacent to its edges so that an excessive amount of glass will not be advanced into the line of draw at these localities, thus making it possible to produce a wide and uniform sheet of glass.

Other objects and advantages of the invention will become apparent during the course of the following description.

In the drawings wherein like numerals are employed to designate like parts throughout the same.

Fig. 4 is an end view of Fig. 2.

Fig. 5 is a plan view of a slightly modified form of roll mounting.

Fig. 6 is a section taken on line 6—6 of Fig. 5, looking in the direction of the arrows.

Fig. 7 shows a slightly modified form of roll.

Figures 1, 2, 3:
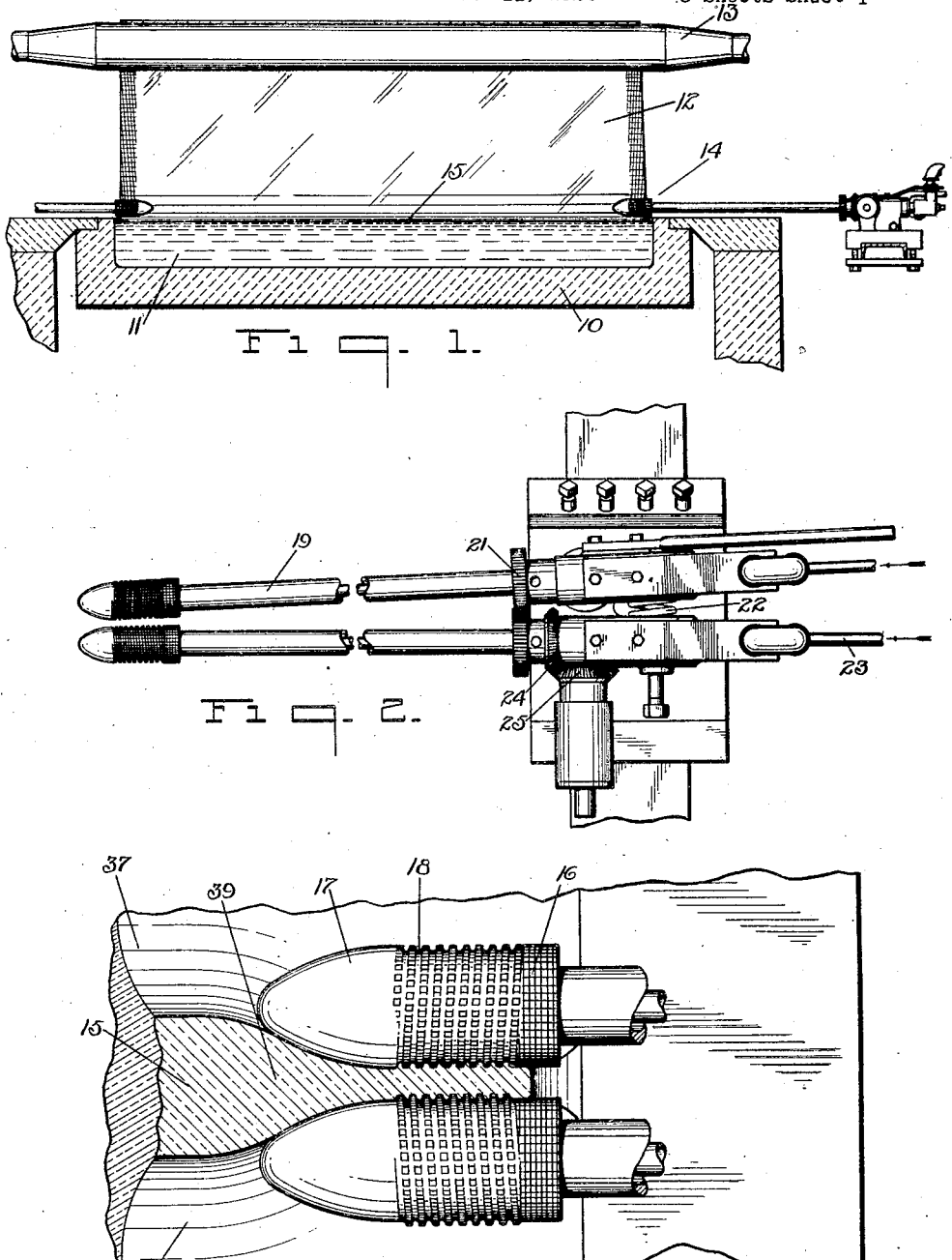
Fig. 1 is a fragmentary transverse section of a drawing machine showing my invention in use.
Fig. 2 is a plan view of the roll mounting.
Fig. 3 is a fragmentary enlarged view showing the position of the rolls at one edge of the sheet when in use.

In the present practice of creating tension along the edges of the sheet with knurled rollers to thereby hold the sheet to width, conditions are created which result in a thick edge area of excessive width on the sheet adjacent the knurled edge.

In accordance with the present invention, knurled rollers are provided that will prevent formation of superfluous surface layer glass at the meniscus, so that but little more in width of surface glass is drawn into the sheet than will be the width of the sheet.

Looking at the drawings, the numeral 10 designates a draw-pot in which is disposed a bath of molten glass 11. The pot 10 rests upon suitable supports and is heated from the bottom by means of burners or the like, which apparatus is not shown in the drawings. The sheet 12 is drawn from the pot 10 and is trained over a bending roll 13, then over the drawing table and leer until the sheet has been satisfactorily completed. In the absence of suitable width maintainers the sheet does not keep a desired width, so to prevent this narrowing up knurled rollers 14 are placed on both sides of the glass and at opposite edges thereof and preferably in the meniscus 15. The knurled rollers 14 comprise a substantially cylindrical knurled body portion 16 and a reduced end 17 as is clearly shown in Fig. 3. The reduced end 17 is preferably smooth and can be any of desired curvature such as disclosed in Figs. 3 and 7. It will be seen that the knurled rollers have substantially a torpedo-shaped formation. The body portion 16 has the knurls thereon arranged preferably in thread-like formation 18, the threads being disposed so that the natural tendency of the glass during the drawing operation will be to be fed outwardly from the pot to neutralize or overcome the normal tendency of the sheet to narrow inwardly.

Figure 8:
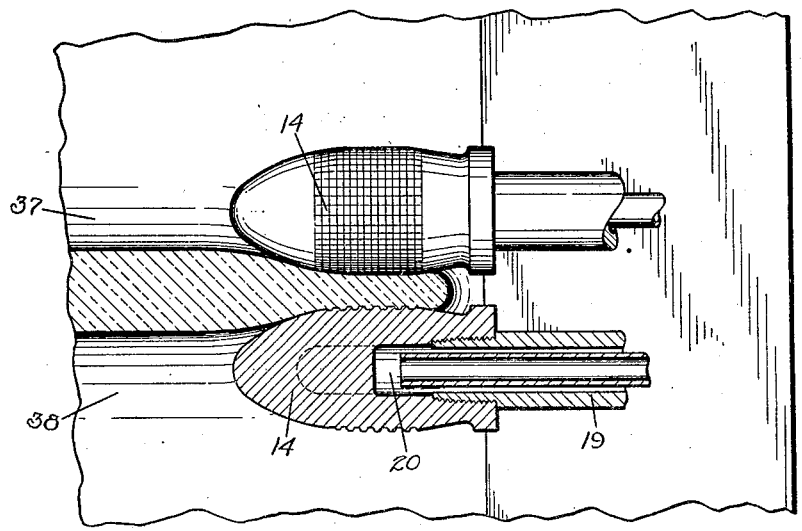
Fig. 8 is a longitudinal section of the roll.
Figure 9:
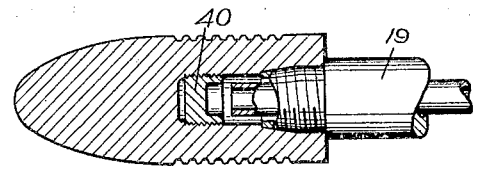
Fig. 9 is a longitudinal section showing a slight modification of the interior thereof.

The knurled rollers 14 are carried upon suitable tubes 19 which are screw-threaded or otherwise associated with the knurl, as indicated in Fig. 8. The knurls are provided with an internally disposed bore 20, which may be of any desired depth. Gears 21 are keyed near the opposite ends of the tubes 19, and in mesh with each other, as shown in Fig. 2. One way of mounting the tubes is to have one tube fixed and the other tube mounted upon a pivot or the like, so that the pivoted tube can move to and from the stationary tube. A spring 22 is arranged between the outer ends of the tube supports so as to normally urge the knurled rollers toward each other. Of course the spring will be sufficiently weak or resilient to permit the drawing of glass between the knurled rollers as indicated in Fig. 3. In order to keep the knurled rollers from overheating, pipes 23 are run through the tubes 19 and extend into the bore 20 in such a manner that the cooling medium may be introduced within the bore 20 through the pipes 23 and allowed to pass out through the tube 19. With this form of construction a continuous flow of cooling medium can be passed through the knurled rollers so that an even and constant temperature can be maintained.

In Fig. 5 the knurled rollers 14 are supported on the tubes 19, which are driven simultaneously as through the gears 21. A beveled gear 24 is carried by one of the tubes while a drive pinion 25 is in mesh therewith to rotate both of the tubes simultaneously and in opposite directions. In the construction shown in Figs. 5 and 6, the tubes 19 are mounted upon a common center so that they will move together when in operation. Looking at Fig. 6 we see that one of the tubes 19 is connected to a ring 26 in which is received the stub-shaft 27 carried by the other of said tubes and rotatably disposed within said ring. A center post 28 is passed up through the bottom of the stub shaft 27 and carries a disc 29 which is received in a suitable groove 30 formed in the ring so as to prevent separation of the parts.

When it is desired to make adjustment the set screws 31 are operated so that the support 32 upon which the tubes 19 are mounted may be moved in the slideway 33 mounted on the rail 34. If it is desired the ring 26 may be locked against rotation by tightening up the set-screw 35 which is passed through the support 32. Any suitable form of power can be coupled to the drive shaft 36 to rotate the knurls.

Preferably the knurled rollers are rotated at a rate of speed slower than the draw of the sheet 12 from the pot 10. The reason for this variance in speed is due to the fact that it is desirable to build up a thicker and comparatively cooler edge so that the edge can sustain the weight of the sheet and will prevent narrowing up of the sheet when going through the rest of the machine.

In use, the knurled rollers are preferably placed so as to grip around the upper taper of the meniscus 15 at each opposite end thereof, and adjacent the side portion of the molten glass in the draw-pot. In the drawing of glass from a supply contained in a pot, it is the presumption that the surface glass 37 and 38 disposed on both sides of the meniscus is drawn up and forms the outer surface or the two sides of the sheet 12. With the new form of knurled torpedo rollers, the knurled portions 18 grip the edges of the sheet sufficiently to retard the draw thereof, while the reduced ends or curved ends 17 taper off the ends 39 of the meniscus next to the gripped edge glass, and thus prevent the formation of excessive surface while gradually reducing the quantity advance of the end glass of the meniscus between the ends 17 of the roller. In other words, the surface area on both ends 39 of the meniscus is reduced before entering into the sides of the sheet, and the meniscus body 39 is tapered, while at the same time made more tractile by the ends 17 of the knurled rollers, thus making it possible to produce a greater amount of sheet width sustaining tension along each edge of the sheet of glass. Furthermore, it is to be borne in mind that the forward point 17 of the knurls which contacts with the surface glass produces a chilling effect so that a relatively heavy bead edge is built up inside of the knurled edge which facilitates the maintenance of sufficient heat in the marginal section of the sheet. This bead building action can be controlled to a great extent by the amount of actual contact of ends 17 with the glass and by the depth of the bore 20 in the knurls. If it is found under certain conditions that the cooling action is too great, a bushing 40 is placed in the bore which is preferably formed from a non-conducting material so that the heat-absorbing action will not extend and function as rapidly through the entire tapered end of the roller. By the provision of tapered rollers, the operation is able to produce a sheet that has a comparatively narrow width of waste glass at the edges, while the resultant net width of sheet will be increased.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. In the art of drawing sheet glass, the method of producing a flat sheet consisting in drawing the sheet from a surface cooled supply of molten glass without restraint except adjacent the border portions of the sheet where the drawn portion of the supplying glass is tapered off laterally to the desired edge thickness while being mechanically restrained from advancement in the line of draw.

2. In the art of drawing sheet glass, the method of controlling the glass movement to the border portions of the sheet being drawn, consisting in giving the opposite end portions of the sheet supplying meniscus body of glass which is being raised along the line of application of the drawing force, such clearance space for movement in the direction of draw between suitable gripping means, that the number of square inches of surface glass at the end portions of the mensicus body of glass which are free to move in response to the tractive force will be gradually limited and reduced adjacent each sheet edge supplying end of the said meniscus body.

3. In combination with a container for molten glass and means for continuously drawing a sheet of glass therefrom, of rolls in contact with both sides of opposite edges of the sheet as it is drawn, each of said rolls having a knurled portion and a tapered smooth portion.

4. In combination with a container for molten glass and means for continuously drawing a sheet of glass therefrom, of rolls in contact with both sides of opposite edges of the sheet as it is drawn, said rolls being substantially torpedo-shaped.

5. In combination with a container for molten glass and means for continuously drawing a sheet of glass therefrom, of rolls in contact with both sides of opposite edges of the sheet as it is drawn, said rolls being substantially torpedo-shaped and having a knurled portion thereon.

6. In combination with a container for molten glass and means for continuously drawing a sheet of glass therefrom, of edge engaging rolls for maintaining the desired width of sheet, each of said rolls having a knurled cylindrical body portion and a smooth reduced end.

7. In combination with a container for molten glass and means for continuously drawing a sheet of glass therefrom, of edge engaging rolls for maintaining the desired width of sheet, each of said rolls having a knurled cylindrical body portion and a smooth reduced end, and means to internally cool the said rolls.

8. In combination with a container for molten glass and means for continuously drawing a sheet therefrom, of means for maintaining the desired width of sheet comprising a support, a slide on the support, a pair of tubes carried by the slide, and a substantially torpedo-shaped glass engaging roll mounted on the end of each tube.

9. In combination with a container for molten glass and means for continuously drawing a sheet therefrom, of means for maintaining the desired width of sheet comprising a support, a slide on the support, a pair of tubes carried by the slide, a substantially torpedo-shaped glass engaging roll mounted on the end of each tube, means to internally cool the rolls, and means to rotate the same at any desired speed.

10. In combination with a container for molten glass and means for continuously drawing a sheet of glass therefrom, of means for maintaining the desired width of sheet comprising a pair of rotatable shafts pivotally mounted upon the same center, substantially torpedo-shaped glass engaging rolls carried by the said shafts, and means to cool the said rolls.

11. A roll for use in sheet drawing apparatus, comprising a cylindrical body portion having knurling thereon arranged in helical formation, and a smooth gradually reduced end.

12. A roll for use in sheet drawing apparatus, comprising a cylindrical body portion having knurling thereon arranged in helical formation, and a smooth gradually reduced end, said roll having a longitudinal recess therein for the reception of a cooling medium.

13. In sheet glass apparatus, means for containing a mass of molten glass, means for drawing a sheet therefrom, and rotatable means at the edges of the sheet, the clearance space therebetween being such that the quantity of glass free to move in the general tractive advance will be reduced progressively toward the edge of said sheet.

14. In sheet glass apparatus, means for containing a mass of molten glass, means for drawing a sheet therefrom, rotatable means at the edges of the sheet, the clearance space therebetween being such that the quantity of glass free to move in the general tractive advance will be reduced progressively toward the edge of said sheet, and means for rotating said means.

15. In sheet glass apparatus, means for containing a mass of molten glass, means for drawing a sheet therefrom, and a pair of rotatable means arranged at the border portions of the sheet being drawn, said means permitting more glass to pass therebetween at their inner ends than at their outer ends.

16. In sheet glass apparatus, means for containing a mass of molten glass, means for drawing a sheet therefrom, a pair of rotatable means arranged at the border portions of the sheet being drawn, said means permitting more glass to pass therebetween at their inner ends than at their outer ends, and means for positively driving said rotatable means.

17. In sheet glass apparatus, means for containing a mass of molten glass, means for drawing a sheet therefrom, and a pair of rotatable means arranged at each border portion of the sheet, said means permitting less glass to pass therebetween progressively from their inner ends toward their outer ends.

18. In sheet glass apparatus, means for containing a mass of molten glass, means for drawing a sheet therefrom, a pair of rotatable means arranged at each border portion of the sheet, said means permitting less glass to pass therebetween progressively from their inner ends toward their outer ends, and means for positively driving said rotatable means.

19. In sheet glass apparatus, means for containing a mass of molten glass, means for drawing a sheet therefrom without restraint except at the border portions, and rotatable means for tapering off the supply glass at the border portions to the desired edge thickness.

20. In sheet glass apparatus, means for containing a mass of molten glass, means for drawing a sheet therefrom without restraint except at the border portions, and a pair of rotatable members at each border portion for tapering off the supply glass at the edge portions to the desired edge thickness.

21. In sheet glass apparatus, means for containing a mass of molten glass, means for drawing a sheet therefrom, and internally cooled rotatable means for tapering off the supply glass at the border portions of the sheet to the desired sheet edge thickness.

Signed at Toledo, in the county of Lucas and State of Ohio, this 8th day of October, 1924.

ENOCH T. FERNGREN.